United States Patent
Roepke et al.

(10) Patent No.: US 7,445,401 B2
(45) Date of Patent: Nov. 4, 2008

(54) CONNECTING ELEMENT FOR RELEASABLY AND VIBRATION DAMPING CONNECTION OF A FIRST COMPONENT TO A SECOND COMPONENT

(75) Inventors: Stephan Roepke, Buxtehude (DE); Markus Horst, Bad Oldesloe (DE)

(73) Assignee: Airbus Duetschland GmbH (DE)

( * ) Notice: Subject to any disclaimer, the term of this patent is extended or adjusted under 35 U.S.C. 154(b) by 227 days.

(21) Appl. No.: 11/123,988

(22) Filed: May 6, 2005

(65) Prior Publication Data

US 2005/0254889 A1 Nov. 17, 2005

(30) Foreign Application Priority Data

May 8, 2004 (DE) .................. 10 2004 022 809

(51) Int. Cl.
  *B25G 3/16* (2006.01)
  *F16B 21/00* (2006.01)
  *A44B 1/04* (2006.01)
(52) U.S. Cl. ............... 403/329; 403/DIG. 14; 411/349; 24/293
(58) Field of Classification Search ........... 403/329, 403/DIG. 14; 411/182, 349, 508–510, 913; 24/293
See application file for complete search history.

(56) References Cited

U.S. PATENT DOCUMENTS

| | | | |
|---|---|---|---|
| 2,200,702 A * | 5/1940 | Oddie | 411/918 |
| 3,292,479 A * | 12/1966 | Tinnerman et al. | 411/918 |
| 6,409,446 B1 * | 6/2002 | Schwarz | 411/552 |
| 6,443,679 B1 | 9/2002 | Schwarz | |
| 6,641,325 B2 | 11/2003 | Schwarz | |
| 6,644,886 B2 * | 11/2003 | Schwarz | 403/329 |
| 7,179,039 B2 | 2/2007 | Schwartz et al. | |
| 2004/0115030 A1 * | 6/2004 | Schwarz et al. | 411/270 |

FOREIGN PATENT DOCUMENTS

| | | |
|---|---|---|
| DE | 297 16 096 U1 | 12/1997 |
| DE | 299 20 499 U1 | 3/2000 |
| DE | 200 16 889 U1 | 1/2001 |
| DE | 100 57 947 A1 | 6/2001 |
| DE | 202 18 301 U1 | 2/2003 |

* cited by examiner

*Primary Examiner*—Victor MacArthur
(74) *Attorney, Agent, or Firm*—Lerner, David, Littenberg, Krumholz & Mentlik, LLP

(57) ABSTRACT

A connecting element for separably connecting a first component to a second component in a vibration damping fashion and, optionally, for compensating tolerances between the first and the second component in a compensation direction, wherein the connecting element comprises a damping ring with an inner sleeve that can be fixed in the first component, as well as a spring element with an oblong hole arranged therein, and wherein a retaining bolt can be snapped between two spring surfaces of the spring element essentially parallel to a snap-in direction. The inner sleeve comprises an insert which comprises either a cylindrical bore or an oblong hole. Alternatively, the connecting element can be respectively realized for producing connections between the components with or without tolerance compensation by selecting the appropriate insert that comprises either a cylindrical bore or an oblong hole.

11 Claims, 4 Drawing Sheets

CONNECTING ELEMENT FOR RELEASABLY AND VIBRATION DAMPING CONNECTION OF A FIRST COMPONENT TO A SECOND COMPONENT

BACKGROUND OF THE INVENTION

The invention relates to a connecting element for releasably connecting a first component to a second component in a vibration damping fashion.

Releasable connecting elements for connecting components are broadly utilized in many technical fields. For example, they are used in the construction of automobiles and aircraft for connecting parts of the inside lining to external support structures of the car body or the fuselage cell, respectively DE 200 16 889 U1 discloses a plate unit for detachable spring clips that is adjustable in two directions in space and serves for mounting wall lining elements or the like. The connecting elements known from DE 200 16 889 U1 respectively comprise a spring element, in which either an elongated hole or a cylindrical bore is arranged. The elongated hole makes it possible to compensate tolerances between the components to be connected, whereas the cylindrical bore does not allow a tolerance compensation.

However, the manufacture of the known connecting elements is complicated because two different punching tools need to be provided and employed for producing an elongated hole or a cylindrical bore in the metallic spring element. In addition, the warehousing expenditure is increased because two variations of the complete and functional connecting element need to be available for connecting tasks with or without tolerance compensation.

SUMMARY OF THE INVENTION

There may be a need to provide an improved connection element.

According to an exemplary embodiment of the invention, a connecting element may be provided for releasably connecting a first component to a second component in a vibration damping fashion and optionally allowing for compensating tolerances between the first and the second component in a compensation direction. Such a connecting element may comprise a damping ring that can be fixed in the first component, an inner sleeve and a spring element with an elongated spring element hole arranged therein, wherein a retaining bolt can be snapped between two spring surfaces of the spring element essentially parallel to a snap-in direction, and wherein the inner sleeve may comprise an insert.

Since the inner sleeve may comprise an insert, the connecting element according to an exemplary embodiment of the invention can be easily adapted to connections that require tolerance compensation and to connections that do not require tolerance compensation, by varying only a simple part in form of the inserts to be inserted into the inner sleeve. According to an exemplary embodiment of the invention, it may now be sufficient to produce an elongated hole in the spring element. The opportunity of compensating tolerances with the aid of the connecting element may be realized, according to an exemplary embodiment of the invention, with different variations of the insert to be inserted into the inner sleeve, wherein one variation of the insert comprises a cylindrical bore and a second variation comprises an elongated hole.

According to an exemplary embodiment of the invention, an option is provided for compensating tolerances between the first and the second component in a compensation direction.

According to an exemplary embodiment of the invention, the fabricating expenditure for the connecting elements may be reduced by simplifying the manufacturing process.

If the different inserts are not installed in the connecting element during its manufacture, but rather directly before its installation, it is also possible to reduce the number of complex parts to be stored and consequently the warehousing expenditure, namely because only one basic type of the connecting element is required and this basic connecting element is adapted to connecting tasks without tolerance compensation or to connecting tasks with tolerance compensation by utilizing the appropriate variation of the insert.

According to an exemplary embodiment of the invention, a bore may be produced in the insert for enabling a connection without tolerance compensation.

Due to this measure, the connecting element can be easily adapted to connecting tasks, in which a compensation of tolerances is not required, by utilizing an insert that may be provided, in particular, with a cylindrical bore. This means that it may be no longer required to produce a cylindrical bore in the spring element rather than an elongated hole.

According to another exemplary embodiment of the invention, the insert may comprise an oblong or elongated hole for producing connections, in which a compensation of tolerances can be realized.

Due to this measure, the connecting element can be easily adapted to connecting tasks, in which an optional compensation of tolerances between components may be required.

According to another exemplary embodiment, the insert may comprise a plastic material.

This exemplary embodiment may allow a particularly simple fabrication of the connecting element because plastic materials can be processed much easier than metallic materials. In addition, inserts manufactured of a plastic material can be easily fixed in the inner sleeve of the connecting element, for example, by means of bonding, pressing, clamping or the like.

According to another exemplary embodiment, the insert may be rigidly connected to the inner sleeve, particularly bonded, vulcanized, pressed or clamped therein.

If the insert is fixed in the inner sleeve in an essentially inseparable or inreleasable fashion, particularly by means of pressing or clamping, the user may be able to easily adapt the connecting element to connections with tolerance compensation or connections without tolerance compensation directly before its installation by simply choosing an insert with a bore or an insert with an oblong or elongated hole.

For this purpose, the insert may comprise suitable connecting means for essentially connecting the insert to the inner sleeve in an inseparable fashion.

DETAILED DESCRIPTION

Figure 1:
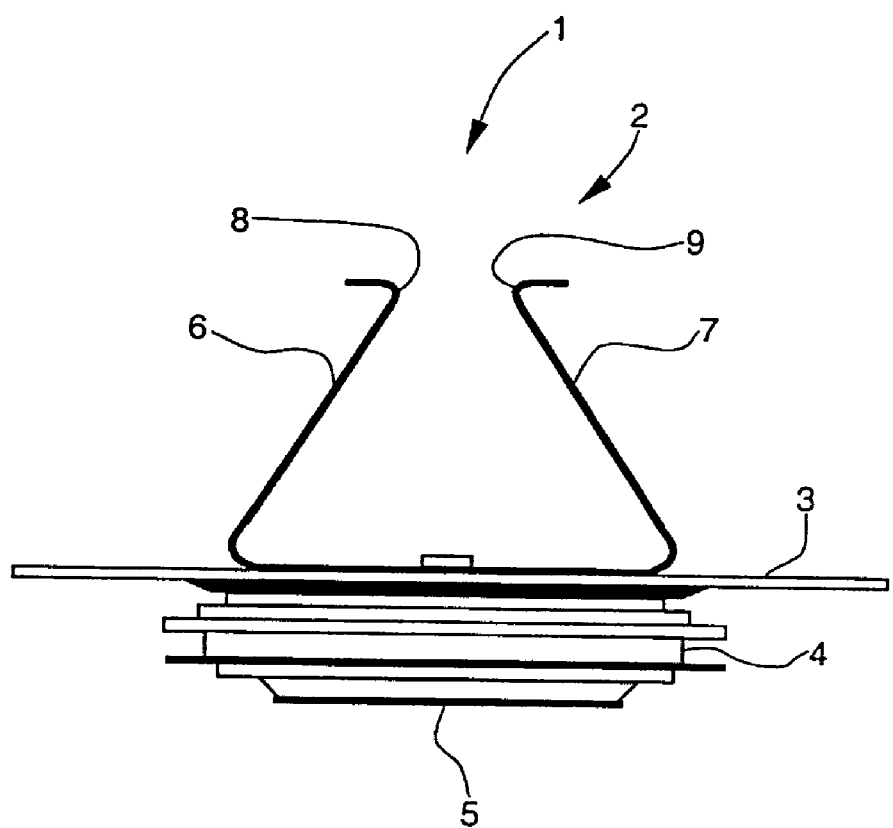
FIG. 1, a schematic side view of a connecting element according to an exemplary embodiment of the invention.

FIG. 1 shows a schematic side view of a connecting element according to an exemplary embodiment of the invention. Identical constructive elements are respectively identified by the same reference numerals.

The connecting element 1 comprises, among other things, a spring element 2, a safety plate 3 and a damping ring 4 for respectively damping vibrations and for decoupling the components to be connected. An inner sleeve 5 is arranged within the damping ring 4. The spring element 2 has a first and a second spring surface 6, 7. The spring element 2 is manufactured from an elastic, springable material, for example spring steel, suitable plastic materials or the like. The first spring surface 6 also comprises a first snap-in tab 8, with a corresponding second snap-in tab 9 being provided on the second spring surface 7. The first and the second snap-in tabs 8, 9 serve for separably engaging into depressions that correspond to the snap-in tabs 8, 9 and are provided on both sides of a retaining bolt that is not illustrated in FIG. 1.

Figure 2:
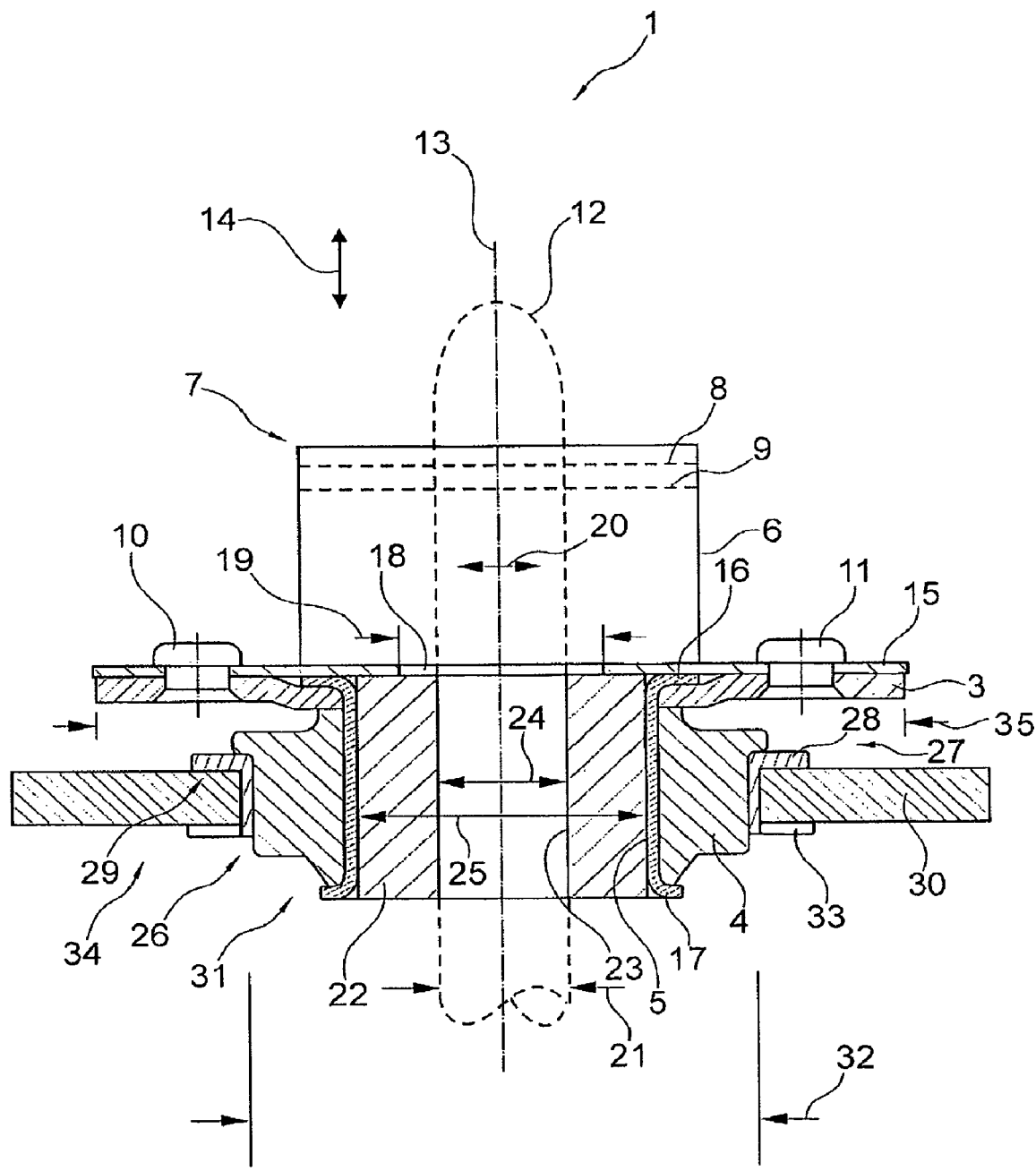
FIG. 2, a section through the connecting element according to the exemplary embodiment of the invention.

FIG. 2 shows a detailed section through a connecting element 1 according to an exemplary embodiment of the invention without tolerance compensation. The spring element 2 has a first spring surface 6 and a second spring surface 7 that is not visible in FIG. 2 and which is arranged behind the first spring surface 6. Forces exerted by the spring element 2 are transmitted onto the damping ring 4 by the inner sleeve 5 and the safety plate 3.

The spring element 2 is fixed on the safety plate 3 with the aid of rivets 10, 11. Alternatively, the spring element could also be attached by means of spot welding, bonding, etc.

A retaining bolt 12 with a vertical axis 13—indicated in the form of a contour drawn with broken lines—is separably or releasably snapped between the spring surfaces 6, 7, if required, by means of an actuating element which is not shown. The retaining bolt 12 is snapped between the spring surfaces 6, 7 parallel to a snap-in direction 14. FIG. 2 shows the retaining bolt 12 in the snapped-in state, in which the retaining bolt 12 produces a frictional connection between the connecting element 1 and a second component that is not illustrated in greater detail in FIG. 2 in order to provide a better overview. In order to enable the retaining bolt 12 to snap between the spring surfaces 6, 7, the end region of the retaining bolt 12 is provided with depressions that correspond to the snap-in tabs 8, 9 on both sides. The snap-in tabs 8, 9 are capable to be at least sectionally or partially frictionally connected in said depressions. The depressions are also not illustrated in FIG. 2 in order to provide a better overview.

An upper collar 16 of the inner sleeve 5 is mechanically fixed or clamped in a rigid fashion between the safety plate 3 and a base plate 15 of the spring element 2. This rigid clamping of the upper collar 16 results from the fact that the spring element 2 is rigidly connected to the safety plate 3, particularly riveted, welded, pressed, clamped or otherwise fixed thereon.

The inner sleeve 5 may be enclosed by the damping ring 4 on all sides. The damping ring 4 is manufactured from a vibration damping material, for example rubber, silicone, plastic or the like. The damping ring 4 is also rigidly connected to the inner sleeve 5, particularly bonded, vulcanized, pressed, clamped or otherwise fixed thereon. The inner sleeve 5 is preferably manufactured from a metallic material, but may alternatively be manufactured of a plastic material. The inner sleeve 5 also comprises a lower collar 17 that serves as an enclosure for the damping ring 4 on both sides.

Regardless of the requirement or the option of a tolerance compensation, an oblong spring element hole 18 for leading through the retaining bolt 12 is always arranged in the spring element 2 and the base plate 15, respectively, in the connecting element 1 according to an exemplary embodiment of the invention. A length 19 of the oblong hole 18 in the spring element ensures that the retaining bolt 12 can be sufficiently displaced or shifted between the spring surfaces 6, 7 in a compensation direction 20. A width of the oblong hole 18 in the spring element extends perpendicular to the paper plane or plane of projection such that it is not visible in FIG. 2 and consequently not identify by a reference numeral. This width of the oblong hole 18 in the spring element may be chosen such that it approximately corresponds to an outside diameter 21 of the retaining bolt 12 in order to prevent clamping.

According to an exemplary embodiment of the invention, an insert 22 is arranged within the inner sleeve 5, for instance in an inseparable fashion.

The insert 22 can be bonded, vulcanized, pressed, clamped or otherwise fixed in the inner sleeve 5. The insert 22 may be manufactured from a plastic material. In the illustration of FIG. 2, the insert 22 comprises a bore 23, the diameter 24 of which essentially corresponds to the outside diameter 21 of the retaining bolt 12. This means that the retaining bolt 12 can be inserted through the insert 22 without or with only slight clearance in order to connect the components. The wall thickness of the insert 22 approximately corresponds to the diameter 25 of the inner sleeve minus the bore diameter 24.

This indicates that the embodiment of the connecting element 1 shown in FIG. 2 does not provide the option of a tolerance compensation in the compensation direction 20, namely because the retaining bolt 12 is received in the insert 22 essentially without any clearance such that it can be displaced parallel to the vertical axis 13 only.

If the connecting element 1 should make it possible to compensate tolerances in the compensation direction 20, the bore 23 in the insert 22 is simply realized in the form of an oblong hole or an insert of the same type that comprises an oblong hole is inserted into the inner sleeve 5. All remaining components of the connecting element 1 remain constructively unchanged.

Consequently, the connecting element 1 according to an exemplary embodiment of the invention can be realized with or without tolerance compensation during its manufacture or directly before its installation by selectively utilizing an insert with an oblong hole or an insert with a cylindrical bore.

For this purpose, the outer surface of the insert 22 may comprise, for example, projections that can be pressed into corresponding depressions in an inner surface of the inner sleeve 5 so as to produce an essentially inseparable connection between the insert 22 and the inner sleeve 5. The rigid connection between the insert 22 and the inner sleeve 5 may also be produced with other connecting techniques, for example, interlocking, screwing, bonding or the like.

This means that a user is able to adapt the connecting element 1 according to an exemplary embodiment of the invention to connecting tasks requiring tolerance compensation and to connecting tasks in which no tolerance compensation is required directly before the installation of the connecting element 1, namely by simply inserting the appropriate insert 22 with a cylindrical bore or with an oblong hole. This may decrease the warehousing expenditure.

Alternatively, it would also be possible to manufacture complete and functional connecting elements that are already equipped with inserts for connecting tasks requiring tolerance compensation, as well as inserts for connecting tasks in which no tolerance compensation is required.

In this case, the insert 22 can be inseparably fixed in the inner sleeves in conventional fashion, for example by means of bonding, vulcanizing or the like, particularly during the manufacture of the connecting elements.

The insert 22 according to an exemplary embodiment of the invention also lowers the noise development and largely prevents rattling noises that could develop due to the movements of the retaining bolt 12 in the inner sleeve 5 and in the spring element 2 if no insert 22 would be provided in the inner sleeve 5.

The damping ring 4 comprises a peripheral recess 26 that essentially serves for fixing the connecting element 1 in the member. An outer sleeve 27 is arranged in the peripheral recess 26, wherein the outer sleeve 27 is rigidly connected to the recess 26, for example by means of bonding, vulcanizing, pressing, clamping or the like. The outer sleeve 27 is also manufactured from a metallic material, but could alternatively consist of a plastic material. The outer sleeve 27 comprises a peripheral retaining collar 28. The retaining collar 28 serves for creating a contact surface 29 for transmitting forces from the connecting element 1 to a first component 30. The first component 30 comprises a mounting bore 31 with a mounting bore diameter 32 that serves for fixing the connecting element 1 on the component. This may be achieved by arranging or inserting the outer sleeve 27 into the mounting bore 31. The outer sleeve 27 and consequently the entire connecting element 1 is then secured within the mounting bore 31 of the first component 30 by means of a peripheral locking ring 33. The locking ring 33 can no longer be easily removed from the outer sleeve 27 after being attached thereon, namely because it engages with the outer sleeve 27. This means that the connecting element 1 usually is inseparably secured in an edge region 34 of the mounting bore 31 and rigidly connected to the first component 30.

The outside diameter 35 of the safety plate 3 may be chosen such that the connecting element 1 cannot be pulled through the mounting bore 31 in case of a malfunction, for example, if the damping ring 4 fractures or tears.

One optional aspect of the connecting element 1 according to an exemplary embodiment of the invention can be seen, in particular, in that it is merely required to selectively utilize an insert 22 with a cylindrical bore or with an oblong hole in order to realize a connecting element 1 with or without tolerance compensation, wherein all other components may remain unchanged. Since the insert 22 may be manufactured from a plastic material, a cylindrical bore 23 and, alternatively, an oblong hole can be very easily produced therein. This may significantly lower the fabrication expenditure.

Figure 3:
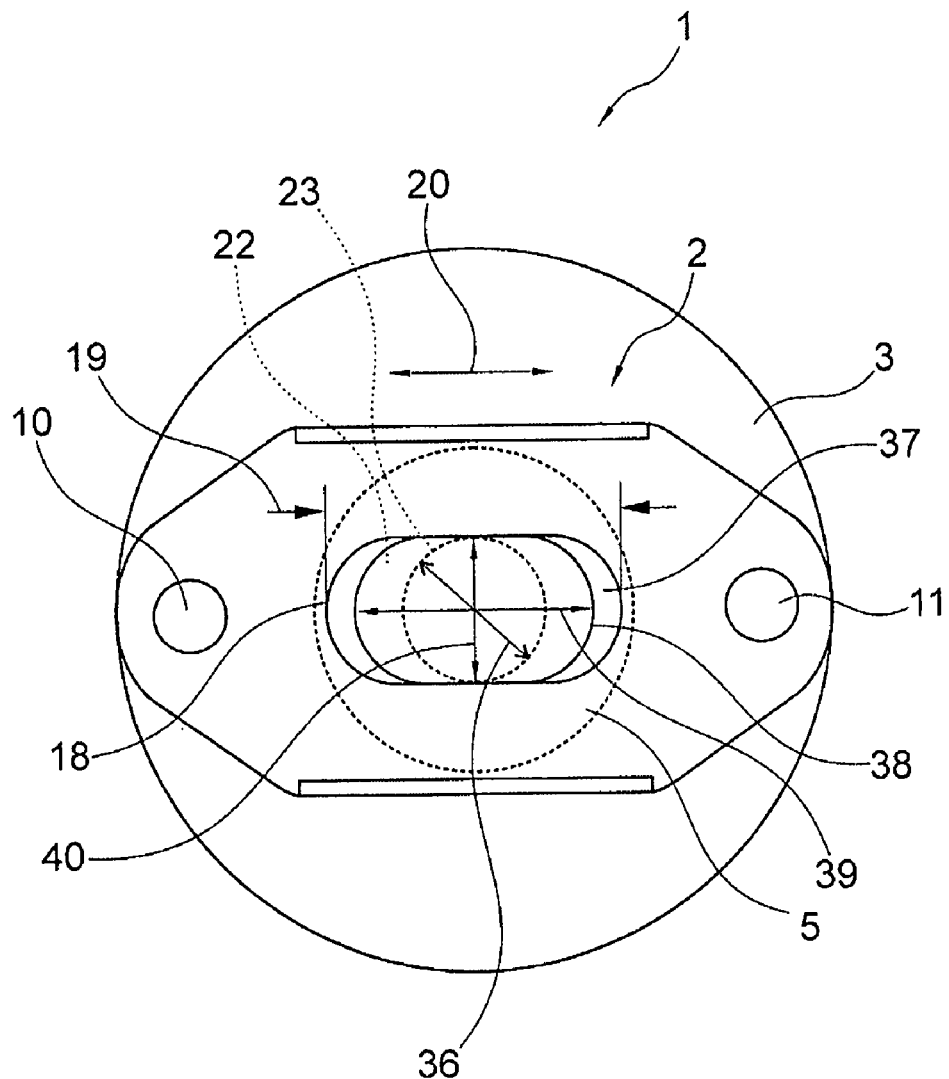
FIG. 3, a top view of the connecting element according to the exemplary embodiment of the invention, in which the spring element is partially broken off, and FIG. 4, a section through an installed connecting element according to an exemplary embodiment of the invention.

FIG. 3 shows a top view of the connecting element 1 according to an exemplary embodiment of the invention with a different insert that allows a tolerance compensation, wherein the spring surfaces 6, 7 are broken off in order to provide a better overview. The rivets 10, 11 connect the safety plate 3 to the spring element 2.

The spring element 2 comprises the oblong spring element hole 18 that has a length 19 and a width 36. A different insert 37 than that shown in FIG. 2 is inserted into the inner sleeve 5 that is illustrated with broken lines. In contrast to the insert 22 according to FIG. 2, this insert comprises an oblong hole 38. The insert 22 with the bore 23 (see FIG. 2) is illustrated with broken lines to allow a comparison of the two inserts. The oblong hole 38 has a length 39 that is shorter than the length 19 of the oblong spring element hole 18 in order to provide a clearer illustration. In the embodiment shown, a width 40 of the oblong hole 38 in the insert 37 approximately corresponds to the width 36 of the oblong hole 18 in the spring element.

In one exemplary embodiment of the connecting element 1 according to the invention, the oblong hole 18 in the spring element and the oblong hole 38 in the insert 37 are essentially realized congruently, wherein the length 19 of the oblong hole 18 in the spring element and the length 39 of the oblong hole 38 are chosen such that the insert 37 still has a sufficient minimum wall thickness. In this case, the minimum wall thickness of the insert 37 results from the difference between the inner sleeve diameter 25 and the length 39 of the oblong hole 38 in the insert 37. In order to still ensure a sufficient mechanical stability of the insert 37, it is possible that the minimum wall thickness of the insert 37 is not smaller than approximately 0.3 mm.

This applies analogously to the minimum wall thickness of the exemplary embodiment with an insert 22 that comprises a cylindrical bore 23.

The length 19 of the oblong hole 18 in the spring element and the length 39 of the oblong hole 38 in the insert 37 may also be provided with such dimensions that a sufficient compensation of tolerances between the components to be connected is possible in the compensation direction 20 in all load and operating states of the connecting element 1. The width 36 of the oblong hole 18 in the spring element and the width 40 of the oblong hole 38 in the insert 37 may be chosen such that the retaining bolt 12 can be guided through the oblong hole 18 in the spring element and the oblong hole 38 in the insert 37 with a slight clearance during the installation. This may reduce or eliminate any risk of jamming.

Alternatively, the oblong hole 18 in the spring element and the oblong hole 38 in the insert 37 may respectively have a different length 19, 39 and/or a different width 36, 40.

Figure 4:
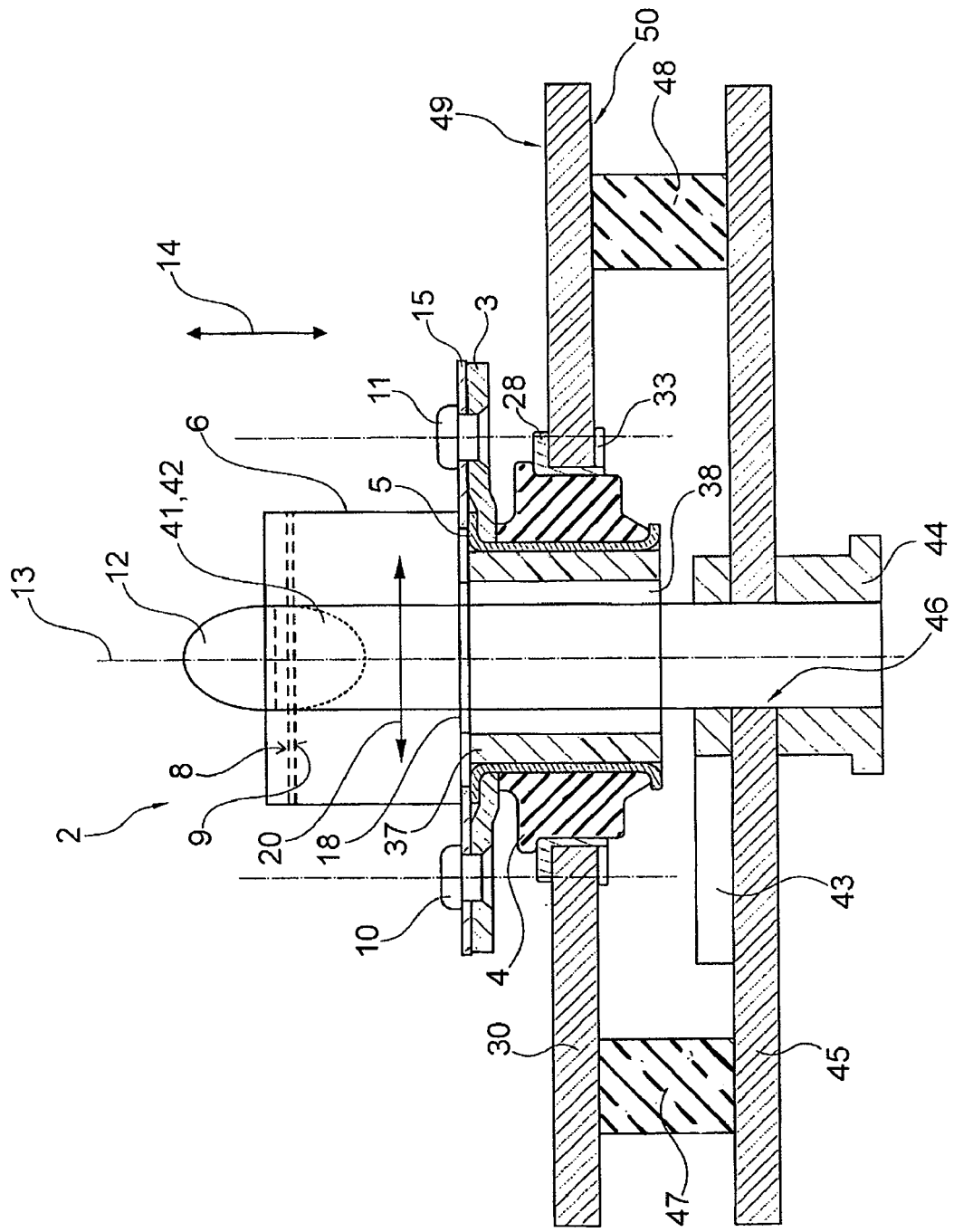

FIG. 4 shows a section through an installed connecting element 1 that makes it possible to compensate tolerances between the components.

The connecting element 1 is fixed within the first component 30, among other things, by the damping ring 4 as described in greater detail above with reference to FIG. 2. The spring element 2 comprises the oblong hole 18. The base plate 15 of the spring element 2 is connected to the safety plate 3 by means of rivets 10, 11.

Both sides of the retaining bolt 12 comprises recesses 41, 42 that are respectively arranged on opposite sides. The snap-in tabs 8, 9 of the spring element 2 engage into these recesses 41, 42 in the snap-in direction 14 and at least sectionally adjoin said recesses 41, 42 to form a frictional connection. The retaining bolt 12 can be turned about the vertical axis 13 by means of an actuating lever 43 such that the spring element 2 can be disengaged again, if so required, by spreading apart the spring surfaces 6, 7. The lower end of the retaining bolt 12 comprises a head section 44 that is supported on the second component 45 or accommodated therein in a rotatable fashion and serves for the transmission of forces. In order to lead through the retaining bolt 12, the second component 45 comprises a bore 46 with a diameter that makes it possible to easily turn the retaining bolt 12.

According to FIG. 3, the insert 37 comprising the oblong hole 38 is arranged in the inner sleeve 5. In other respects, the constructive design resembles that of the embodiment of the connecting element 1 described with reference to FIG. 2. The oblong hole 38 in the insert 37 makes it possible to displace the first and the second component 30, 45 relative to one another in the compensation direction 20. If tolerance compensation in the compensation direction 20 is not desired, the insert 22 (see FIG. 2) comprising the cylindrical bore 23 is inserted into the inner sleeve 5 instead of the insert 37.

In addition, at least two buffers 47, 48 are arranged between the first component 30 and the second component 45 in order to ensure a defined pre-stress between the components 30, 45. This may make it possible to largely prevent rattling noises caused by relative movements between the components 30, 45. Alternatively, it would also be possible to provide a central buffer that at least partially encloses the retaining bolt 12. The buffers 47, 48 or the central buffer, respectively, may be manufactured from an elastic material, for example plastic, caoutchouc, rubber or the like. The retaining bolt 12 may be formed of a metallic material, a plastic material or the like.

A ring of an elastic material or the like that is not illustrated in greater detail in FIG. 4 and functions analogous to the buffers 47, 48 may be additionally provided between the retaining collar 28 and an upper side 49 of the first component 30 or between the underside 50 of the first component 30 and the locking ring 33, respectively, in order to fix the connecting element 1 within the first component 30. This may serve for generating a defined pre-stress or bias between the retaining collar 28 and the first component 30.

The connecting element according to an exemplary embodiment of the invention may be intended, in particular, for connecting panel or plate elements for the inside lining of transport means, particularly of aircraft, to a substructure that may serve for fixing the inside lining on the fuselage cell structure, particularly such that the connection can be easily separated, if so required.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

LIST OF REFERENCE NUMERALS

1 Connecting element
2 Spring element
3 Safety plate
4 Damping ring
5 Inner sleeve
6 First spring surface
7 Second spring surface
8 First snap-in tab
9 Second snap-in tab
10 Rivet
11 Rivet
12 Retaining bolt
13 Vertical axis
14 Snap-in direction
15 Base plate
16 Upper collar
17 Lower collar
18 Oblong hole in spring element
19 Length (of oblong hole in spring element)
20 Compensation direction
21 Outside diameter (of retaining bolt)
22 Insert
23 Bore
24 Bore diameter
25 Inner sleeve diameter
26 Recess
27 Outer sleeve
28 Retaining collar
29 Contact surface
30 First component
31 Mounting bore
32 Mounting bore diameter
33 Locking ring
34 Edge region
35 Outside diameter (of safety plate)
36 Width (of oblong hole in spring element)
37 Insert
38 Oblong hole
39 Length
40 Width
41 Recess
42 Recess
43 Actuating lever
44 Head section
45 Second component
46 Bore
47 Buffer
48 Buffer
49 Upper side of component
50 Underside of component

The invention claimed is:

1. A connecting element for separably connecting a first component to a second component in a vibration damping fashion, wherein the connecting element comprises:
a damping ring,
an inner sleeve, and
a spring element with an oblong spring element hole,
wherein the damping ring can be fixed in the first component,
wherein a retaining bolt can be snapped between a first and a second spring surfaces of the spring element essentially parallel to a snap-in direction,
wherein the inner sleeve comprises an insert; and
wherein the insert is exchangeable;
wherein the insert comprises a bore with circular dimensions for realizing a connection without tolerance compensation or oblong hole dimensions for realizing a connection with tolerance compensation;
wherein a base plate of the spring element is rigidly connected in contact with a safety plate and an upper collar of the inner sleeve is arranged between the base plate of the spring element and the safety plate; and
wherein the spring element is fixed on the safety plate.

2. The connecting element of claim 1, wherein the insert is manufactured from a plastic material.

3. The connecting element of claim 1,
wherein the insert is rigidly connected to the inner sleeve, by the means of bonding, vulcanization, pressing or clamping therein.

4. The connecting element of claim 1, wherein the damping ring comprises a peripheral outer recess in which recess an outer sleeve with a retaining collar is arranged in order to create a contact surface for the connecting element in an edge region of a mounting bore within the first component, and wherein the damping ring is held in the mounting bore by a locking ring.

5. The connecting element of claim 4, wherein the outer sleeve is adapted for being rigidly connected to the damping ring, particularly by bonding, pressing, clamping or vulcanizing.

6. The connecting element of claim 1, wherein the spring element is realized with the first and second spring surfaces that are located essentially parallel to and opposite of one another.

7. The connecting element of claim 1,
wherein the inner sleeve has an essentially annular cross-sectional geometry with an inner sleeve diameter.

8. The connecting element of claim 1,
wherein an outside diameter of the safety plate is larger than a mounting bore diameter.

9. The connecting element of claim 1, wherein the first and the second spring surface comprise first and second snap-in tabs that are respectively directed toward one another and can be snapped into corresponding recesses on both sides of the retaining bolt.

10. The connecting element of claim 1, wherein the inner sleeve is adapted for being rigidly connected to the damping ring particularly by bonding, pressing, clamping or vulcanizing.

11. The connecting element of claim 1,
wherein the spring element is riveted, welded or bonded to the safety plate.

* * * * *

UNITED STATES PATENT AND TRADEMARK OFFICE
CERTIFICATE OF CORRECTION

PATENT NO. : 7,445,401 B2  Page 1 of 1
APPLICATION NO. : 11/123988
DATED : November 4, 2008
INVENTOR(S) : Stephan Röpke and Markus Horst It is certified that error appears in the above-identified patent and that said Letters Patent is hereby corrected as shown below:

Title page, (73) Assignee: Airbus Duetschland GmbH (DE) should read --Airbus Deutschland GmbH (DE)--.

Signed and Sealed this

Twenty-fourth Day of February, 2009

JOHN DOLL
*Acting Director of the United States Patent and Trademark Office*